(12) United States Patent
Sankar

(10) Patent No.: US 9,934,217 B2
(45) Date of Patent: Apr. 3, 2018

(54) INDEX FOR ELECTRONIC STRING OF SYMBOLS

(71) Applicant: Facebook, Inc., Menlo Park, CA (US)

(72) Inventor: Sriram Sankar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 327 days.

(21) Appl. No.: 13/952,474

(22) Filed: Jul. 26, 2013

(65) Prior Publication Data

US 2015/0033119 A1    Jan. 29, 2015

(51) Int. Cl.
| | | |
|---|---|---|
| *G06F 17/00* | (2006.01) | |
| *G06F 17/27* | (2006.01) | |
| *G06F 3/023* | (2006.01) | |
| *G06F 3/0482* | (2013.01) | |
| *H04L 29/08* | (2006.01) | |
| *G10L 13/08* | (2013.01) | |
| *G06F 17/30* | (2006.01) | |
| *H04L 12/58* | (2006.01) | |
| *G06Q 50/00* | (2012.01) | |
| *G06F 17/24* | (2006.01) | |

(52) U.S. Cl.
CPC .......... *G06F 17/273* (2013.01); *G06F 17/274* (2013.01); *G06F 3/0237* (2013.01); *G06F 3/0482* (2013.01); *G06F 17/24* (2013.01); *G06F 17/3053* (2013.01); *G06F 17/3097* (2013.01); *G06F 17/30867* (2013.01); *G06Q 50/01* (2013.01); *G10L 13/08* (2013.01); *H04L 51/32* (2013.01); *H04L 67/22* (2013.01)

(58) Field of Classification Search
CPC ...... G06F 17/273; G06F 17/274; G06F 17/24; G06F 3/0237; G06F 17/30867; G06F 17/3053; G06F 17/3097; G06F 3/0482; G10L 13/08; G06Q 50/01; H04L 51/32; H04L 67/22
USPC ............... 715/257–263; 704/263–267
See application file for complete search history.

(56) References Cited

U.S. PATENT DOCUMENTS

| | | | |
|---|---|---|---|
| 7,010,522 B1 | 3/2006 | Jagadish | |
| 9,384,389 B1* | 7/2016 | Sankaranarayanan | G06K 9/00456 |
| 2002/0003898 A1* | 1/2002 | Wu | G06F 17/278 382/187 |
| 2003/0200199 A1 | 10/2003 | Snyder | |
| 2004/0059574 A1* | 3/2004 | Ma | G10L 13/08 704/254 |
| 2005/0257147 A1* | 11/2005 | Brill | G06F 17/273 715/257 |
| 2006/0179052 A1 | 8/2006 | Pauws | |

(Continued)

OTHER PUBLICATIONS

ORESOFT LWC, "WDM 38: Spelling Correction Using Ngram Overlap Technique," available at FTP: https://www.youtube.com/watch?v=Qmrki2CoElk; Oresoft.com, 2010.

(Continued)

*Primary Examiner* — Quoc A Tran
(74) *Attorney, Agent, or Firm* — Baker Botts L.L.P.

(57) ABSTRACT

In one embodiment, a method includes accessing a string of symbols by a computing device. The string is divided into one or more string components each including at least one of the symbols, and each string component is associated with at least one string-position identifier. The string components and their respective associated string-position identifiers are stored for the string of symbols.

15 Claims, 5 Drawing Sheets

(56) References Cited

U.S. PATENT DOCUMENTS

| | | | |
|---|---|---|---|
| 2006/0293880 A1* | 12/2006 | Elshishiny | G06F 17/30737 704/10 |
| 2008/0015841 A1* | 1/2008 | Longe | G06F 3/0236 704/1 |
| 2008/0065607 A1 | 3/2008 | Weber | |
| 2008/0189605 A1* | 8/2008 | Kay | G06F 3/0237 715/257 |
| 2010/0153376 A1* | 6/2010 | Davidson | G06F 17/276 707/723 |
| 2010/0153880 A1* | 6/2010 | Dinn | G06F 3/0236 715/816 |
| 2013/0066895 A1 | 3/2013 | Choi | |
| 2014/0222416 A1* | 8/2014 | Huang | G06F 17/30687 704/9 |

OTHER PUBLICATIONS

Manning, et al., "Introduction to Information Retrieval," Cambridge University Press; available at FTP: http://nlp.stanford.edu/IR-book/pdf/irbookonlinereading.pdf, 2008.

Broder, et al., "Efficient Query Evaluation using a Two-Level Retrieval Process," IBM Research Center, NY, IL and CA, pp. 426-434, Nov. 3-8, 2003.

International Search Report and Written Opinion for International Application PCT/US2014/047928, dated Nov. 7, 2014.

* cited by examiner

INDEX FOR ELECTRONIC STRING OF SYMBOLS

TECHNICAL FIELD

This disclosure generally relates to query completion and spell correction.

BACKGROUND

Communicating with or by an electronic device often requires a user to enter a string of symbols. Such strings may include e.g., text, numbers, characters, symbols such as "%" and "$", etc. Users may incorrectly enter a desired string, such as when a user misspells a word in e.g., an email, document, text message, etc. In addition, having to fully enter intended strings takes time and provides opportunity for errors in entering the string, such as e.g. misspellings.

SUMMARY OF PARTICULAR EMBODIMENTS

A record for an electronic string of symbols may be created by dividing the string of symbols in string components, associating the components with string-position identifiers, and storing those components and corresponding position-identifiers in the record associated with the string of symbols. That record may be used to correct misspelled words or complete search queries or other partially-entered text. For example, a string input by a user of a client computing device may be a misspelled word, and that received string may be divided into its string components and associated string-position identifiers. Those received string components and associated string-position identifiers may be compared to the contents of one or more records, and one or more of the string of symbols associated with the record may be provided for display to the user (e.g. to correct the misspelled word). In addition to the string components and associated string-position identifiers of a string of symbols, a record may include other string components (e.g. common misspellings, if the string of symbols is a word) associated with string-position identifiers and the string components of a string of symbols associated with other string-position identifiers (e.g. identifying positions of letters that are found in correctly-spelled but in an incorrect place, if the string of symbols is a word.)

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
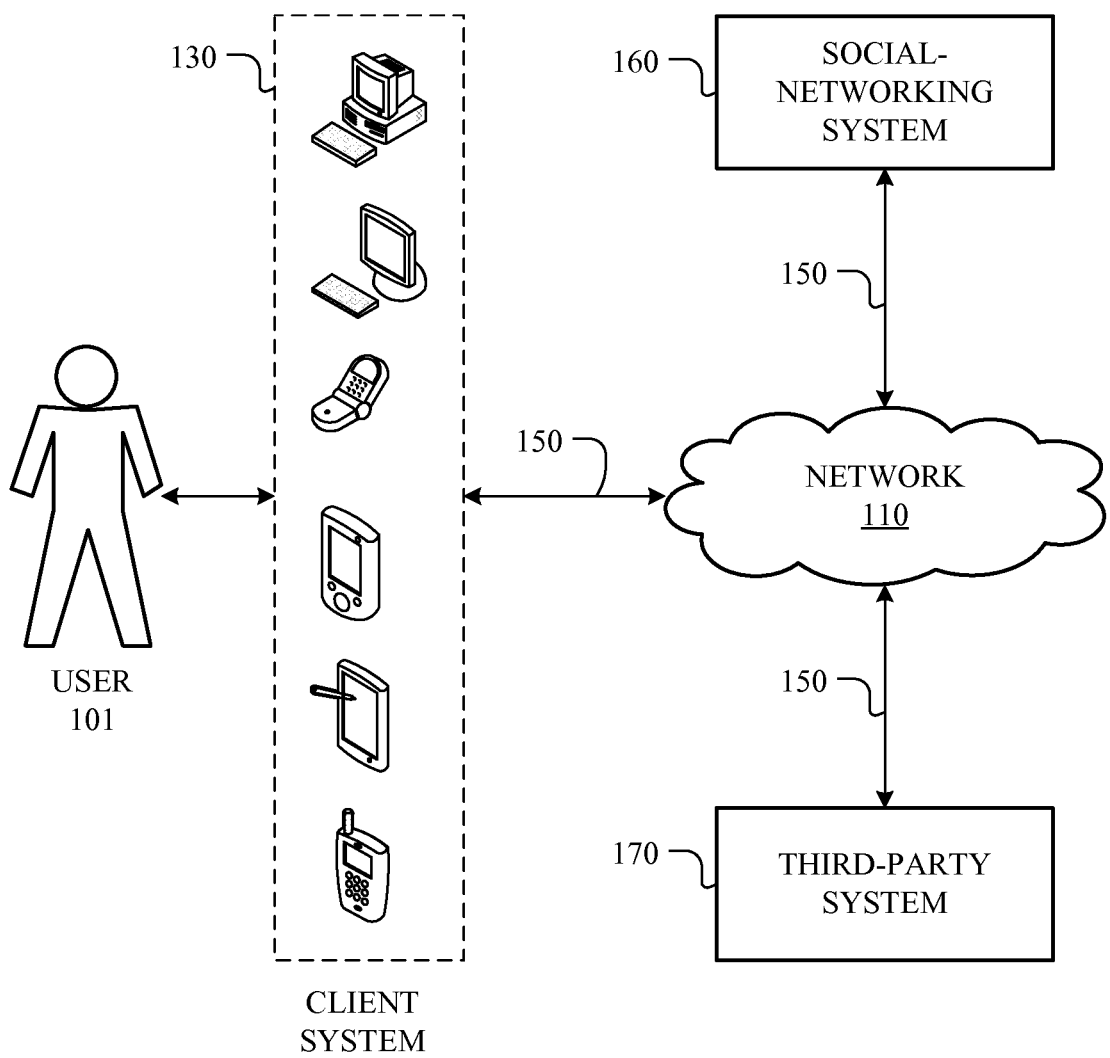
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host various functions of third-party system 170. Third-party system 170 may generate, store, receive, and send third-party system data. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
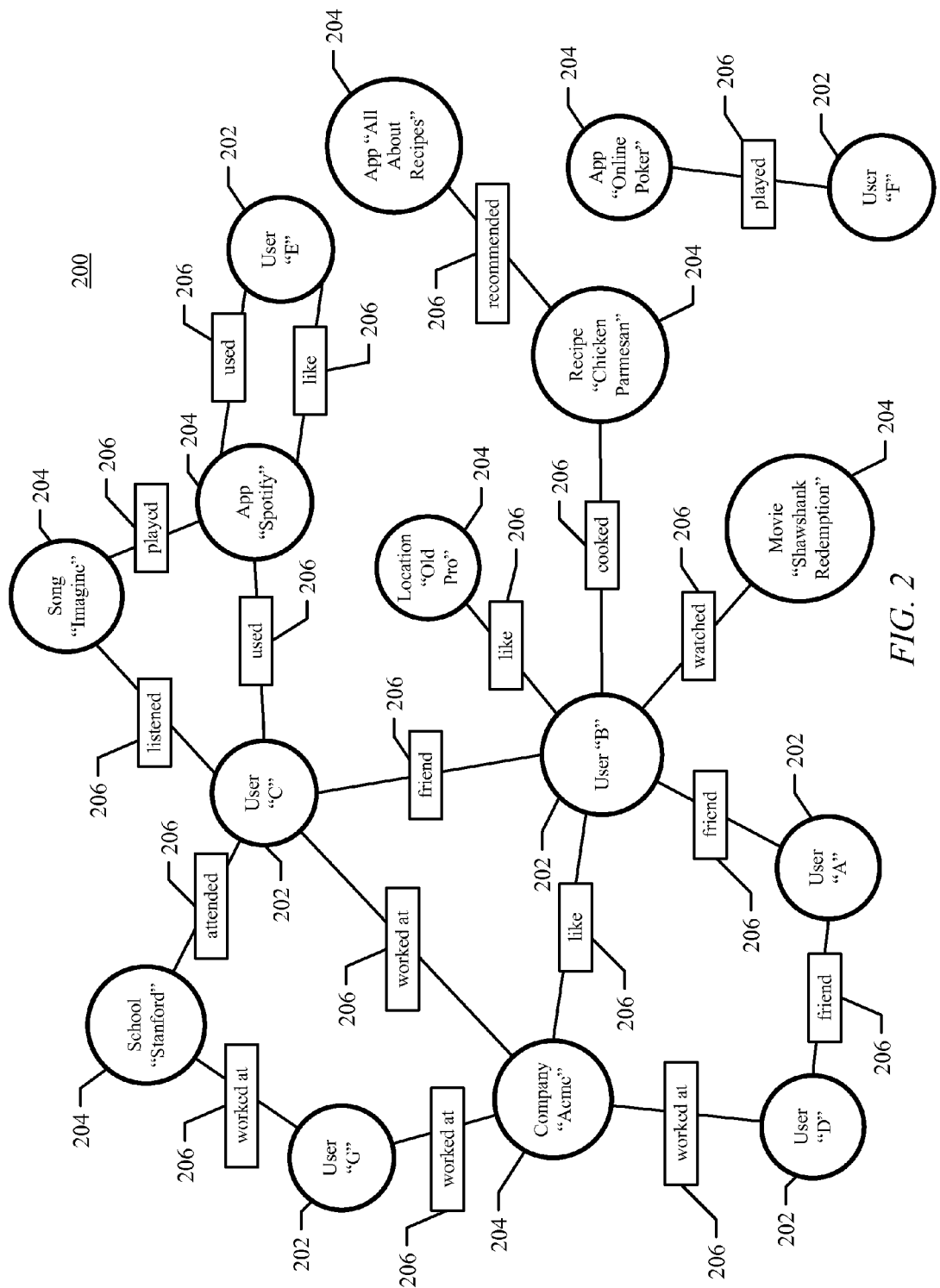
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
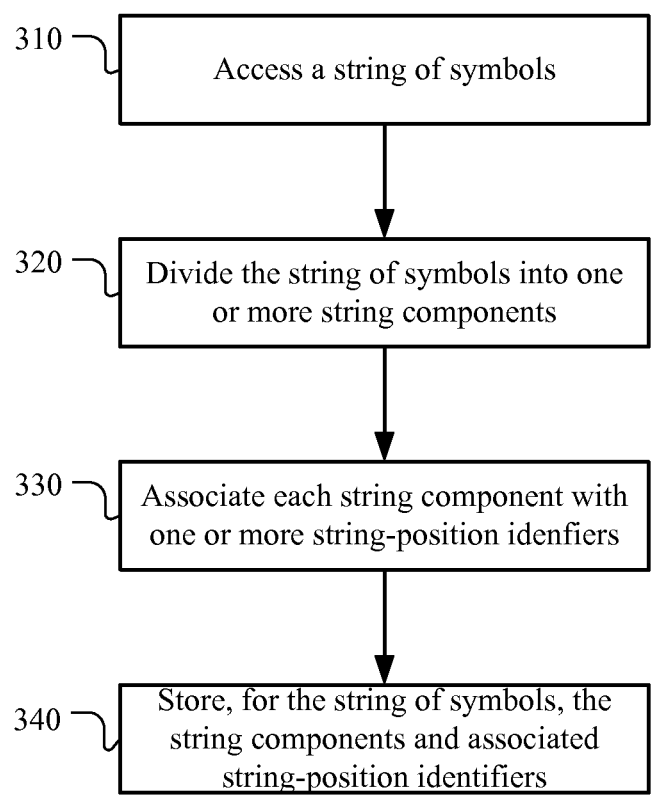
FIG. 3 illustrates an example method 300 for creating a set of records containing strings of symbols.

FIG. 3 illustrates an example method 300 for creating a set of records containing strings of symbols. Symbols may be any suitable symbols, such as alphabetic symbols, alphanumeric symbols, symbols such as "$" or "%", etc. Strings of symbols may be of any suitable length and contain any suitable symbols. The method may begin at step 310, where a string of symbols is accessed by a computing device, such as a client computing device, a server computing device, or any other suitable computing device. Strings may be accessed by any suitable method, such as for example from the memory or other components of the computing device accessing the string, from another computing device, etc. In particular embodiments, accessing the string includes receiving the string at the computing device or from a component of a computing device. At step 320, the string of symbols is divided into one or more string components, where each string component is at least one of the symbols. In particular embodiments, if a string of symbols is a word, then the string components may be the letters making up the word. For example, a string may be "phone", and string components may be "p", "h", etc. In particular embodiments, string components may be more than one of the symbols. For example, "ph" may be one string component of the string "phone". Strings may be divided into string components according to a set of rules, such as e.g., letters commonly found together such as "oo", "qu", etc. or a particular number of symbols, such as two symbols per component. This disclosure contemplates dividing strings into string components according to any suitable set of criteria.

At step 330, each of the string components is associated with at least one string-position identifier. The string-position identifier identifies the position of its associated string component in a string, such as in the string of symbols being divided. The position may be identified by any suitable method. For example, the position may be identified by identifying the position of the string component relative to one or more other string components (e.g., that the string component is two string components removed another string component). As another example, the position may be identified by identifying the position of the string component relative to a particular reference point of the string of symbols, such as the beginning of the string. In that example, the position identifier may be a number identifying the position of the string component in the string. For example, "phone" may be represented by "ph:1", "o:2", "n:3", "e:4". The numbering may start at any suitable number. In particular embodiments, the last component of a string may be represented by an end-of-string identifier. For example, the position identifier "4" in the example above may be associated with the end of the string "phone", or the string component "e" may be associated with an explicit identifier indicating the end of the string has been reached. In particular embodiments, string components may be associated with string-position identifiers other than those that identify the position of the component in string of symbols. For example, string components and position identifiers may be used e.g., to correct misspelled words (as described as more fully below), and thus string-position identifiers near those string-position identifiers may be associated with a string component. For example, "phone" may be misspelled as "phoen", and thus string components and associated string-position identifiers may include "e:3" and "n:4". Any of the string components may be associated with any suitable string-position identifiers. In particular embodiments, the string-position identifiers to associate with a string component may be determined from a set of rules, such as e.g., string-position identifiers one or two positions away from the actual string-position of the string component in the string of symbols. While this disclose describes particular examples of string-position identifiers associated with string components, this disclosure contemplates any suitable string components associated with any suitable string-position identifiers.

At step 340, the computing device stores the string components and their respective string-position identifiers for the string of symbols. In other words, the components of the string of symbols and their respective associated position identifiers are stored in association with the string of symbols. The component and position identifiers may be stored in any suitable structure, such as in one or more databases, indices, etc.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for creating a set of records containing strings of symbols that includes the particular steps of the method of FIG. 3, this disclosure contemplates any suitable method for creating a set of records containing strings of symbols that includes any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, additional string components may be stored for the string of symbols. For example, when the string of symbols comprises a word, additional letters may be stored. For example, "phone" may include string components that are commonly found in misspellings of "phone", and those string components may be associated with any of the string-position identifiers associated with the string components in step 330 or with any other suitable string-position identifier. In particular embodiments, the determination of which other string components to store for the string of symbols may be made according to a set of rules or criteria. In particular embodiments, other string components may include string components having a phonetic similarity to one of the string components of the string of symbols. For example, "f" may be stored for the string "phone", given its phonetic similarity to "ph". As another example, "June" may include the string component "oo" given its phonetic similarity to "u" in "June". In particular embodiments, other string components may include letters near other letters on a symbol-input layout of a client computing device, where the other letters are string components of the string of symbols. For example, if the symbol-input layout is a QWERTY keyboard, the string "phone" may include the string components "i" (which is adjacent to the component "o" on a QWERTY keyboard), "m" (which is near the string component "n" on a QWERTY keyboard), etc. This disclosure contemplates any suitable symbol-input layout, including other keyboard layouts, touchpad layouts, etc. In particular embodiments, other string components may include string components identified by a user of a client computing device. For example, a user may frequently misspell "pairs" as "perrs", and thus may identify "e" as a string component to store for the string "pairs". In particular embodiments, other string components may include string components determined from past usage of the client computing device. For example, misspellings frequently input on the client computing device may be determined by e.g., any suitable machine-learning technique, and the string components of those misspellings may be stored for the string of symbols. String components determined from past usage of the client computing device may be user-dependent, such as determined from user profiles associated with the client computing device, such as for example profiles associated with a social-networking system. In other words, the string component determined from the past usage may vary from user to user of the client computing device, and different string components may be stored for different users for a given string of symbols. In particular embodiments, other string components may include string components determined from past usage of other client computing devices, such as string components involved in misspellings made by users of other client computing devices. In particular embodiments, the other client devices may be determined by identifying users having one or more relevant similarities (e.g., age, education, client device used, etc.) as a user for whom the string of symbols is being stored. Similarities between users and/or past usage may be determined by any suitable method, for example from nodes, edges, or profiles of a social-networking system. While this disclosure describes specific examples of the type of other string components that may be stored for a string of symbols, this disclosure contemplates any suitable other string components being stored for a string of symbols.

Figure 4:
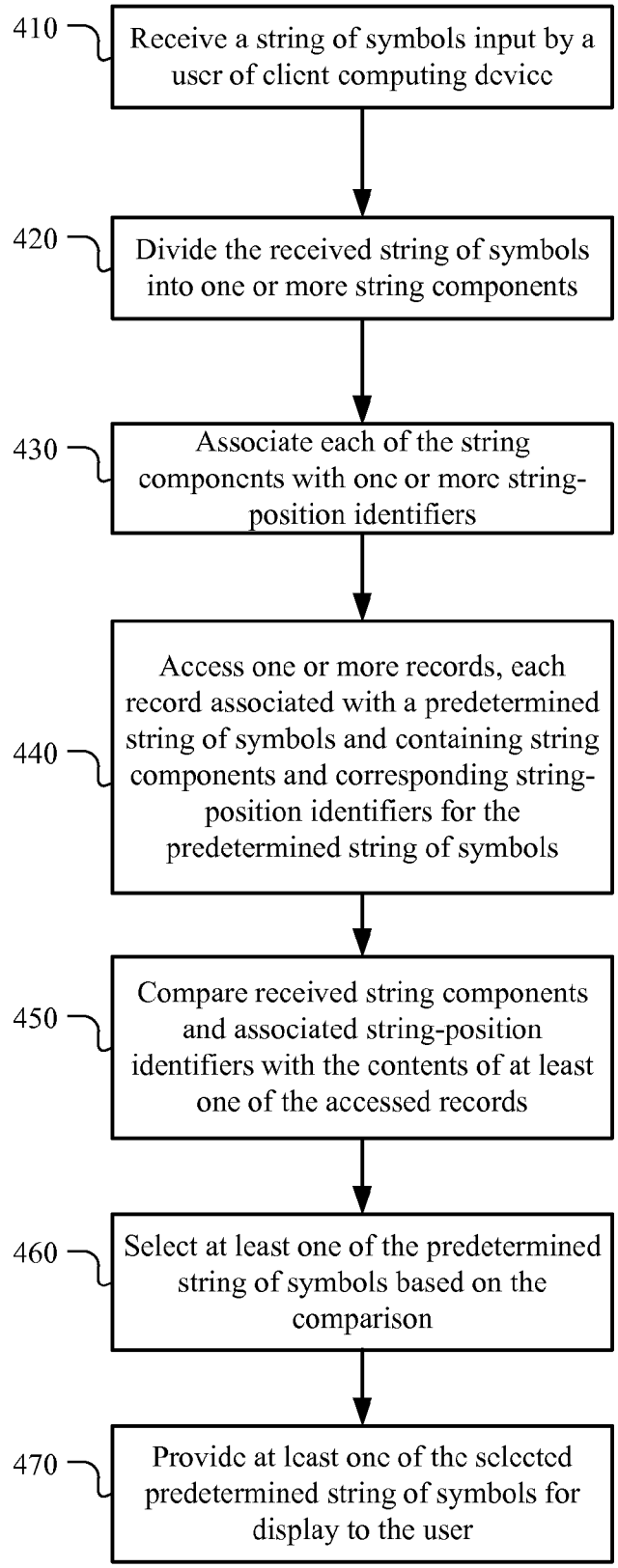
FIG. 4 illustrates an example method for providing a predetermined string of symbols to a user of a client computing device in response to receiving an input string of symbols from the user of a client computing device

FIG. 4 illustrates an example method 400 for providing a predetermined string of symbols to a user of a client computing device in response to receiving an input string of symbols from the user of a client computing device. The method may begin at step 410, where a computing device receives a string of symbols input by a user of a client computing device. The symbols may be received at any suitable computing device, such as the client computing device, another client computing device, a server computing device, etc. At step 420 the received string of symbols is divided into one or more string components, where each string component is at least one of the symbols. The description corresponding to step 320 of FIG. 3 applies to step 420, where appropriate. At step 430, each of the string components is associated with a string-position identifier identifying the received string component's position in the received string of symbols. The description corresponding to step 330 of FIG. 3 applies to step 430, where appropriate.

At step 440, one or more records are accessed, with each record associated with a predetermined string symbols and containing string components and associated string-position identifiers for the string of symbols associated with the record. The string component and associated string-position identifiers may have been stored in the record in accordance with the method of FIG. 3, and may include other string components, as discussed above. For example, a predetermined string of symbols may be "phone" and the record may include "ph:1" "f:1" "o:1" "o:2" "o:3", etc. As described herein, "accessing" may include accessing or receiving from any suitable computing device or component of a computing device.

At step 450, for each of one or more of the accessed records, at least some of the received string components and their associated string-position identifiers are compared with at least some of the string components and associated string-position identifiers of the accessed record. For example, a received string may be "fone", and its string components and associated string-position identifiers may be "f:1", "o:2", "n:3", "e:4". Those components and identifiers are compared with components and identifiers in at least one of the accessed records, for example by using and AND or a weak AND query. A weak AND query may include weighting each element or portion of the query, and returning "true" if the sum of the weights of those elements found in the data being queried is greater than a predetermined threshold. For example, if a query includes elements A, B, and C (which may be strings, characters, data elements, or any other suitable query element or portion) then a weak AND query would evaluate whether each of those elements was found in the data being queried. The sum of the weights would then be compared to a threshold, and if the sum was greater than the threshold, the weak AND query would return "true." In particular embodiments, comparing may include determining whether each of the received string components having their respective associated string-position identifiers are in the record. That determination may be made by any suitable method, such as for example by performing an AND query with each of the received string components and associated string-position identifiers. For example, for the received string component "fone", comparing may include determining whether "f:1" "o"2" "n:3" and "e:4" are all in a particular record. In particular embodiments, comparing may include determining whether any of the received string components and respective associated string-position identifiers are in the record.

At step 460, at least one of the predetermined strings of symbols associated with one of the records of step 450 is selected based on that comparison. In particular embodiments, more than one predetermined string of symbols may be selected. In particular embodiments, no string of symbols may be selected. In particular embodiments, selecting a predetermined string of symbols based on a comparison may include selecting the predetermined string of symbols if the certain compared features are found in the record. For example, when comparison includes determining whether each of the received string components having their respective associated string-position identifiers are in the record, only those predetermined sting of symbols associated with records for which the determination is true may be selected. In particular embodiments, selecting a predetermined string of symbols based on a comparison may include scoring the preselected string of symbols based on the comparison. For example, scoring may include determining whether each of the received string components and their respective associated string-position identifiers are in the record, as described above. As another example, one or more weights may be associated with one or more of the received string components, and scoring may be based on the weights associated with those string components. For example, a score may include a sum of weights associated with the received string components. In particular embodiments, a score may include only those weights associated with received string components having a corresponding string component in the record and associated with the same string-position identifier. For example, if a received string component and associated string-position identifier is "o:3", then a weight associated with that string component may be included in a score for a predetermined string of symbols if "o:3" is also found in the record associated with that predetermined string of symbols. In particular embodiments, the value of a weight may be positive, zero, or negative (e.g., a score may be reduced (weight is negative) or not increased (weight is zero) if a received string component is not found in the record and/or if it is found in the record but not with a corresponding string-position identifier). In particular embodiments, the value of a weight may depend on the degree of match between the respective string-position identifier associated with the received string component associated with the weight and the string-position identifier associated with a corresponding string component in the record for the predetermined string of symbols. For example, if a received string component and associated string-position identifier is "o:3" and "o:3" is in a record, "o"3" may receive a particular weight. If only "o:4" and/or "o:2" is in the record then "o:3" may receive a lower weight. If only "o:1" and/or "o:5" is in the record then "o:3" may receive an even lower weight, etc. A weight may also or in the alternative depend on a string component having an end-of-string identifier in both the received string and the record. In particular embodiments, the presence of string components in a record that are not present in a received string may result in a lower score. For example, a record for "phonetic" may include the string components in the record for "phone", plus several additional components. Thus, "phone" may be scored more highly than "phonetic" for the received string "fone". In particular embodiments, a score for a predetermined string of symbols may be compared to a predetermined threshold score, and those predetermined string of symbols having a score greater than the threshold may be selected. This disclosure contemplates any suitable criteria for selecting a predetermined string of symbols or method of scoring that predetermined string of symbols.

At step 470, at least one of the selected predetermined strings of symbols is provided for display to a user, which may include displaying the string to the user. In particular embodiments, providing for display may include presenting the predetermined string of symbols to the user for the user to accept or deny inclusion of the string or replacement of another string. For example, if the received string of symbols is a misspelled word and the predetermined string of symbols is a correctly-spelled word, the correctly-spelled word may automatically replace the misspelled word or may be presented to the user for the user to indicate whether to accept or reject replacement. As another example, in particular embodiments if a string is a partially-completed word or phrase (e.g. as in a search query) and the predetermined string of symbols is a completed word or phrase, then the completed word/phrase may automatically replace the partially-completed word/phrase or may be presented to the user for the user to indicate whether to accept or reject completion. In particular embodiments, more than one predetermined string of symbols may be provided for display to the user. In particular embodiments, the predetermined strings of symbols may be displayed in a particular order, such as e.g. according to their score.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates the example method associated with FIG. 4 including the particular steps of the method of FIG. 4, this disclosure contemplates any suitable method for providing a predetermined string of symbols to a user of a client computing device in response to receiving an input string of symbols from the user of a client computing device as including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
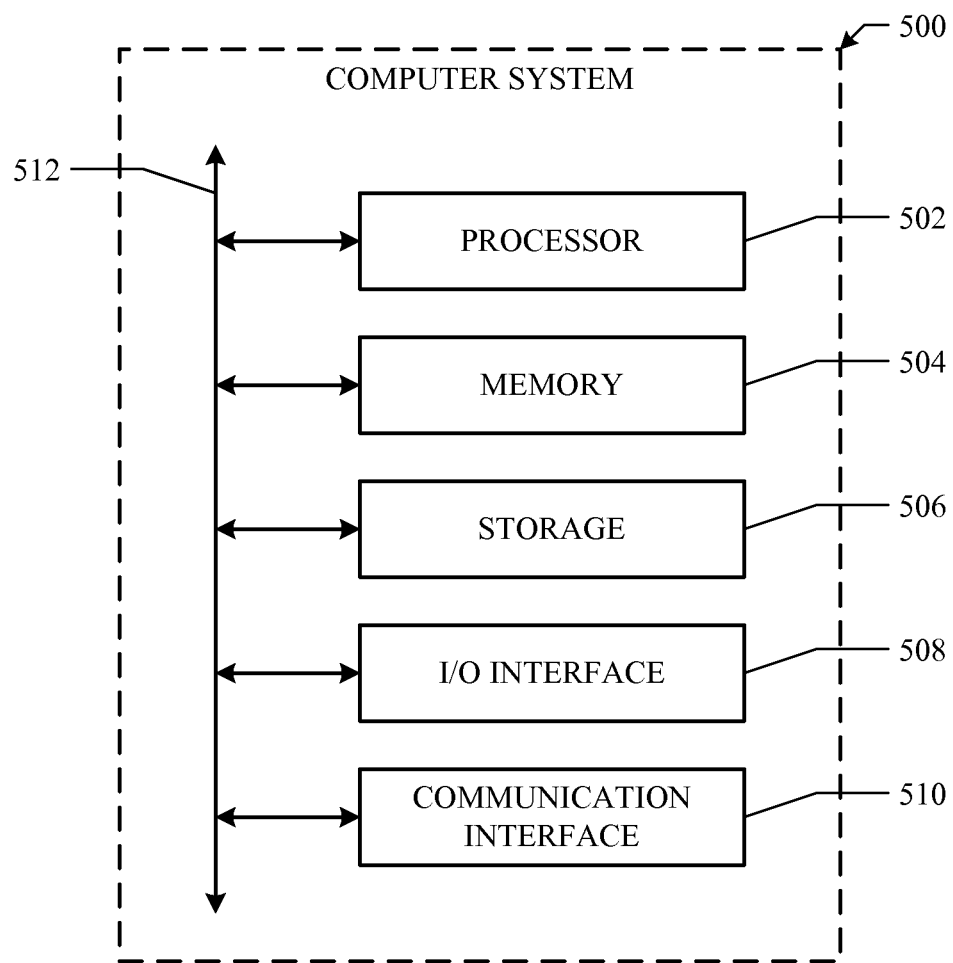
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, accessing a string of symbols associated with a predetermined word;
   by the computing device, dividing the string of symbols into one or more string components each comprising at least one of the symbols;
   by the computing device, associating each of the string components with a string-position identifier based on at least one predetermined rule;
   by the computing device, associating an additional string component with one of the string-position identifiers associated with the string components, wherein the additional string component is different from the string component associated with that string-position identifier; and
   by the computing device, generating a stored record associated with the word, wherein the stored record comprises:
      the one or more string components and their respective associated string-position identifiers; and
      the additional string component and its associated string-position identifier;
   wherein the additional string component:
      has a phonetic similarity to the string component associated with the same string-position identifier associated with the additional string component;
      comprises a first symbol having a corresponding first input key being located near a second input key on a symbol-input layout of a client computing device, the second input key corresponding to one of the symbols associated with the string component associated with the same string-position identifier associated with the additional string component;
      is defined by a user of the client computing device;
      is determined from past usage of the client computing device; or
      is determined from past usage of one or more other client computing devices.

2. The method of claim 1, further comprising, by the computing device:
   associating one or more other string components with each of one or more other string-position identifiers; and
   storing in the record the other string components and their respective associated other string-position identifiers.

3. The method of claim 1, wherein the string of symbols comprises a word.

4. A method comprising:
   by a computing device, receiving a string of symbols input by a user of client computing device;
   by the computing device, dividing the received string of symbols into one or more received string components each comprising at least one of the symbols;

by the computing device, associating each of the received string components with a string-position identifier;

by the computing device, accessing a plurality of records, each record associated with a predetermined word and a corresponding predetermined string of symbols, each record comprising:

one or more second string components each associated with a second string-position identifier based on at least one predetermined rule, each of the second string components comprising at least one of the predetermined string of symbols; and an additional string component associated with one of the second string-position identifiers, wherein the additional string component is different from the second string component associated with that second string-position identifier;

by the computing device, comparing, for each of one or more of the accessed records, at least some of the received string components and their associated string-position identifiers with at least some of the second string components and the additional string component and their associated second string-position identifiers of the accessed record;

by the computing device, selecting based on the comparison one or more of the compared records; and by the computing device, providing the predetermined word associated with at least one of the selected records for display to the user;

wherein the additional string component:

has a phonetic similarity to the second string component associated with the same second string-position identifier associated with the additional string component;

comprises a first symbol having a corresponding first input key being located near a second input key on a symbol-input layout of the client computing device, the second input key corresponding to one of the symbols associated with the second string component associated with the same second string-position identifier associated with the additional string component;

is defined by a user of the client computing device;

is determined from past usage of the client computing device; or is determined from past usage of one or more other client computing devices.

5. The method of claim 4, wherein the string of symbols input by the user of the client computing device comprises a partially-completed word; and the predetermined word provided for display to the user is a completed word.

6. The method of claim 5, wherein the partially-completed string of symbols input by the user of the client computing device comprises a partially-completed query or portion of the query; and the predetermined word provided for display to the user comprises a completed query or portion of the query.

7. The method of claim 4, wherein the string of symbols input by the user of the client computing device comprises a misspelled word; and the predetermined word provided for display to the user is a correctly-spelled word.

8. The method of claim 4, wherein the selected record associated with the predetermined word provided for display to the user comprises a set of string components and associated respective string-position identifiers that match the received string components and their respective string-position identifiers, wherein set of string components and their respective string-position identifiers are selected from the one or more second string components and the additional string component and their respective second string-position identifiers.

9. The method of claim 4, wherein selecting based on the comparison comprises scoring the selected record associated with the predetermined word provided for display.

10. The method of claim 9, wherein the score is based one or more weights, each weight associated with at least one of the received string components.

11. The method of claim 10, wherein a value of at least one of the weights depends at least in part on a similarity between the respective string-position identifier associated with the received string component associated with the weight and the second string-position identifier of a corresponding second string component in the selected record associated with the predetermined word provided for display.

12. The method of claim 10, wherein the score is based on a sum of the weights.

13. The method of claim 9, wherein the score of the selected record associated with the predetermined word provided for display is greater than a predetermined threshold score.

14. The method of claim 9, wherein the step of providing further comprises providing the predetermined words respectively associated with a plurality of the selected records for display to the user ordered according to their score.

15. One or more computer-readable non-transitory storage media embodying software that is operable when executed to:

receive a string of symbols input by a user of client computing device;

divide the received string of symbols into one or more received string components each comprising at least one of the symbols;

associate each of the received string components with a string-position identifier;

access a plurality of records, each record associated with a predetermined word and a corresponding predetermined string of symbols, each record comprising:

one or more second string components each associated with a second string-position identifier based on at least one predetermined rule, each of the second string components comprising at least one of the predetermined string of symbols; and an additional string component associated with one of the second string-position identifiers, wherein the additional string component is different from the second string component associated with that second string-position identifier;

compare for each of one or more of the accessed records, at least some of the received string components and their associated string-position identifiers with at least some of the second string components and the additional string component and their associated second string-position identifiers of the accessed record;

select based on the comparison one or more of the compared records; and provide the predetermined word associated with at least one of the selected records for display to the user;

wherein the additional string component:

has a phonetic similarity to the second string component associated with the same second string-position identifier associated with the additional string component;

comprises a first symbol having a corresponding first input key being located near a second input key on a symbol-input layout of the client computing device, the second input key corresponding to one of the symbols associated with the second string component associated with the same second string-position identifier associated with the additional string component;

is defined by a user of the client computing device;

is determined from past usage of the client computing device; or is determined from past usage of one or more other client computing.

* * * * *